United States Patent [19]

Johnson

[11] Patent Number: 4,878,676
[45] Date of Patent: Nov. 7, 1989

[54] SEAL-FLUSHING IN CENTRIFUGAL-PUMPS, IMPROVED METHODS AND APPARATUSES

[75] Inventor: John W. Johnson, Cuidad Bolivar, Venezuela

[73] Assignee: Chaldar, Inc., Denver, Colo.

[21] Appl. No.: 98,205

[22] Filed: Sep. 18, 1987

[51] Int. Cl.⁴ .................... F16J 15/00; F01D 15/00
[52] U.S. Cl. .................................... 277/24; 415/121.2
[58] Field of Search ................... 277/15, 24; 415/112, 415/116, 121 A, 169 R

[56] References Cited

U.S. PATENT DOCUMENTS 3,643,964  2/1972  Snelling et al. .................... 277/24
3,938,541  2/1976  Polacheck et al. ................. 277/24 X
4,602,806  7/1986  Salinger ........................... 277/24 X Primary Examiner—David Werner

[57] ABSTRACT

Disclosed is an improved method of centrifugal pump impeller-shaft seal-flushing; comprising the step of supplying pressurized seal flush fluid to a centrifugal pump impeller-shaft seal within an operating centrifugal pump:
(a) axially, from the rear;
(b) radially, circumferentially evenly; and
(c) circumferentially, inclined forwardly at a positive acute angle from parallel-to-axial.

Thus resulting in greatly prolonged seal life.

2 Claims, 4 Drawing Sheets

SEAL-FLUSHING IN CENTRIFUGAL-PUMPS, IMPROVED METHODS AND APPARATUSES

BACKGROUND OF THE INVENTION

1. Field of the Invention

This discovery and invention concern improvements in the flushing of impeller-shaft seals within working centrifugal pumps whenever and wherever such flushing is required (normally when there is a mixture of liquids and abrasive solids being pumped). And more particularly (but not by way of limitation), to specific methods and apparatus for supplying flush fluid to seal housing-enclosures of centrifugal pumps in such a manner as to provide for a more thorough and a more complete and a more efficient flushing of impeller-shaft seals and seal housing-enclosures, and thus thereby greatly prolong seal life in centrifugal pumps.

2. Description of the Prior Art

Consider the usual centrifugal slurry pump assembly (FIG. 2): An impeller shaft 11 turns an impeller 22 within pump cavity 29 inside pump case 28. Pump case 28 is mounted on pump case mounting plate 23 which is attached to a base 21. Also on base 21 is bearing housing 25 through which runs impeller 11. Within seal housing-enclosure 26 are seal seat 13 and seal(s) 14. Seat 13 is attached to seal housing-enclosure 26. Seal(s) 14 are fixed to impeller 11, turn with impeller 11, and are held in place against seal seat 13 by spring 31.

Previous-to-this-invention known methods and apparatus for prolonging the life of centrifugal pump impeller-shaft seals 14 when pumping abrasive slurrys under high pressure proved unsatisfactory in my applications; the seal life when pumping sand and gravel was from less than a DAY to at the most a WEEK; (more sand pumped, the shorter the seal life). After my theoretical analysis indi resulted in non-complete flushing due to the manner of the introduction of the flushing fluid flow; I experimented extensively in the field over many years with many different seal types and seal flushing methods and apparatus. As a result of this extensive and intensive experimentation in the course of my continuing alluvial diamond mining operations in the Orinoco river basin jungle in southern Venezuela, I have (FIG. 1) radially improved the impeller-shaft seal(s) life on my sand-and-gravel centrifugal pumps. The seals are now changed only when the pump is dismantled to change the impeller due to wear on the impeller (two to three MONTHS), and even then the seals are not yet really worn, but are changed anyway as a matter of prudence and convenience.

Prior to my invention, known apparatus, method, and practice (FIG. 2) for flushing centrifugal pump impeller-shaft seals 14 was to simply place an inlet pipe 27 for the flush fluid somewhere near the middle on the seal(s) housing-enclosure 26. This inlet pipe 27 was then connected via a hose 24 to a clean source of flush fluid, normally the same type of fluids as that being pumped. This flush fluid was supplied at a higher pressure than that which the pump developed so as to force flush fluid into the seal(s) housing-enclosure 26 and then out into the pump cavity 29 between the pump case 28 and the rear of the impeller 22, thus flushing abrasives-laden fluid-borne debris away from the seal(s) 14.

In (prior to this invention) standard accepted theory, the higher pressure of the flush fluid was presumed to be sufficient to insure that no abrasive-laden fluids from the pump cavity 29 entered into the seal(s) housing-enclosure 26.

In practice it rarely, if ever, worked this way. Somehow abrasive-laden fluids from the pump cavity 29 did enter the seal(s) housing-enclosure 26 and rapidly wore out the seal(s) 14 and seal seat 13. As this occurred, there was increasing leakage from the seal(s) 14, until finally complete seal failure allowed air to enter the pump cavity 29, which caused the pump to lose its pressure and stop pumping. To remedy this, the extensive labor, expense, lost time, and inconvenience to completely dismantle the pump and change the seals had to be undergone. Obviously, the longer the seal life, the better.

Development of Pump Seals in Southern Venezuela

Originally seal enclosures were called "stuffing boxes." Probably they were just that, with waste or string or whatever was at hand just stuffed around the impeller shaft. Stuffing boxes probably were first developed to keep steam from escaping from the plunger rod on the very first steam engines and then were adapted to use on pumps.

Eventually an oil and graphite impregnated, woven cotton packing was developed and is still used on many types of pumps. It works good, but one must be continually greasing it, tightening up the flange that holds the packing in the stuffing box and compresses it around the impeller shaft. Its main disadvantage (especially in solids pumps) is that solids get in along with the packing and form a grinding compound on the impeller shaft. This wears the shaft rapidly. Once the shaft is worn and rough it eats the packing rapidly. The first gravel pumps here in the Orinoco river basin used stuffing boxes and the local merchant imported the packing by the ton. To overcome the wear problem flushing was developed many years ago to flush ahead of the stuffing box but wasn't too successful so was never tried here. Also, in low pressure operations, the stuffing box is still somewhat satisfactory IF one maintains the packing tight and greases it often, once a day at least. This what I have used on the dredge pump on my raft when I have had a "head" of less than 12 feet.

But, in my land operations where I've used the pumps to pump off overburden we were pumping with a head up to 50 feet high and over distances of 200 to 500 meters. This puts a lot of pressure on the pumps and water tries to get out wherever it can. Lots of fine abrasives in the water leaked along the impeller shaft and so packing would last only a day at MOST.

So, on the local pumps built here they tried seals. These worked better than packing, especially since they didn't eat the impeller shaft. However, the seals were expensive. The seal seats would hold up (made of simple steel) but seals of plastic, bronze, ceramic, or hard rubber simply did not last.

The first successful substitute here was the electric light socket; the type that is made of molded rubber with two pigtails at the rear. The metal cone and pigtails were removed and the rubber holder was trimmed to shape to fit in the original seal holder. It was better than packing and factory seals, but still didn't last long.

Then they tried seals cut out of the old type of flat pulley belts (leather, plastics, rubber, etc. also were tried and discarded). Better than light sockets and one of the best materials yet and some still use it.

Also they tried pieces of rubber which were also better than light sockets and equal to flat pulley belt and easier to cut.

So the local merchant went to a hose company in Caracas and had them fabricate a special hose to use for seals. The hose now comes in two inside diameters, 15/16" to use on 1⅜" shafts and 17/16" to use on 1½" shafts.

The hose has the advantage that one piece of hose does all the functions of a seal. Being of a smaller inside diameter (I.D.) than the outside diameter (O.D.) of the impeller shaft it has to be forced onto the shaft thus sealing it. The end of the hose has to be cut and sanded very squarely to make a tight fit with the seal. Then the hose is cut a little longer than the distance between the impeller and the seals so that when the impeller is tightened up on the shaft it compresses the hose which then forces the squared face against the seal seat and maintains the seal until the face wears down, or the hose loses its elasticity and the "seal" has to be replaced.

As this was the best solution found then, I used my gravel pump with it. It worked fine when we tested it locally on gravel under a low head of river water. But when we put it to work pumping sand from about 50 meters away, the seals lasted only one day. This is considered "normal" here. Many local pumps are small diameter and high speed with only 6 bolts to take off the front; so, it's only about a two hour job to change the seals.

But my main pump (slow speed, large diameter) (doesn's wear out as fast and costly hard face rods are not necessary) has an awful lot of bolts and it is a full one day job to change the seals.

So I had to come up with something better to prolong seal life. Flushing was an improvement but hadn't had that great a success. Why not? I went over flushing theory and present practice and while theory of excess pressure should guarantee complete flushing, I new in practice it didn't work that way. Why not? Obviously the flushing action wasn't complete. Why not? As pressure and volume can be controlled and still the flushing action is not complete, I speculated then the manner of introducing the flushing fluid to the seal housing-enclosure was to blame; leading me to consider how it could be improved and what method would provide the best flow through the impeller-shaft seal housing-enclosure to provide the most complete flushing action.

As there is (FIG. 4) a space 41 on rear plate 12 of seal housing-enclosure 26 between the outside diameter (O.D.) of seal seat 13 and the inside diameter (I.D.) of seal housing-enclosure 26, I figured that if one introduced the flushing fluid through the rear of rear plate 12 through inlet holes 15 evenly spaced all around this area 41, from a water-jacket 33 (FIG. 3) attached to the rear of rear plate 12 with flush-fluid entering jacket 33 through inlet pipe 27 and hose 24, it would provide for a smoother flow through seal housing-enclosure 26. Also, the even spacing of inlet holes 15 would make for a more evenly distributed flow of flushing fluid. Only the action of impeller shaft 11 would disturb the flow. Why not take advantage of this to give the flow an axial swirl? So I angled (angle "A") inlet holes 15 in the direction of impeller shaft rotation (FIG. 1).

On the first model I also put a stuffing box behind the seal housing just in case.

Wasn't necessary. The flushing action was so complete no changes of seal were necessary due to seal wear.

Only when wear on the impeller itself reduced pumping capacity and the impeller had to be changed, was a new seal installed. We have quite a pile of still serviceable old seals and mainly give then to neighbors when they run short.

This VASTLY improved seal life is due, I believe, to the more thorough and more efficient flushing of the seal(s) housing-enclosure through use of the methods and apparatus of my invention, and is generally applicable to all situations where abrasive-laden fluids are being pumped by centrifugal pumps and thus there is a need to flush thoroughly the seal(s) housing-enclosure in order to prolong impeller-shaft seal(s) life.

SUMMARY OF THE INVENTION

Thus, among the distinctive improvements of my impeller-shaft seal-flushing invention (FIG. 1) is the dramatically, radically, and significantly increased seal(s) life over previously known seal flushing methods and apparatus. This has been accomplished by my experimental discovery and practical implementation of three distinct improvements in the manner of injecting clean, higher-than-pump-pressure flush fluid; these three improvements being implementable either singly, doubly in any combination, or all together.

Improvement One: Injecting flush fluid from the rear of the seal(s) housing-enclosure 26, ; so that flush fluid enters seal(s) housing-enclosure 26 in an axially forward flow.

Improvement Two: Injecting flush fluid from all around the circumference of the inner periphery of the rear of the seal(s) housing-enclosure 26; so that flush fluid enters seal(s) housing-enclosure 26 through evenly spaced, circumferentially placed inlets 15 and thus is evenly distributed all around the seal(s) and throughout the seal(s) housing-enclosure.

Improvement Three: Injecting flush fluid through angled holes (slots) (grooves) 15, which are angled (declined) (inclined) in the direction of impeller-shaft rotation; in other words, forwardly through rear plate 12 of seal housing-enclosure 26 at a positive acute angle from parallel-to-axial. So that flush fluid flushes seal housing-enclosure 26 more completely, this occurring, I believe, because then the flush fluid flows through seal(s) housing-enclosure 26 with a forward axial swirl.

The method and device of this invention thus can be defined in the following manner:

In a pump shaft sealing assembly, comprising a pump shaft having an impeller, a seal assembly for said pump shaft, a housing enclosing said seal assembly; the improvement of a method of flushing said seal assembly, said method comprising the steps of: (a) injecting pressurized seal flush fluid into said seal housing on a side of said seal opposite said impeller such that the flush fluid flows axially forwardly over said seal assembly towards said impeller; (b) causing said flush fluid to be injected equally circumferentially spaced about the periphery of the seal; and (c) continuing to inject said flush fluid in a direction at an acute angle to the axis of said pump shaft in the direction of rotation of the impeller.

In a centrifugal pump assembly including a pump shaft having an impeller, a seal assembly for said pump shaft, and a housing enclosing said seal assembly, the improvement comprising an inlet located on a side of said seal opposite said impeller for pressurized flush fluid, a plate of said housing located between said inlet and said seal assembly having a plurality of axially extending, equally circumferentially spaced inlets formed therein, said inlets inclined at an acute angle to the axis of said pump shaft in the direction of rotation of the impeller.

DESCRIPTION OF THE DRAWINGS

FIG. (FIG.) 1 is a partially cut-away schematic perspective representation with directional labeling of the inclination of inlet holes 15 of an apparatus utilizing the method of the current invention.

DESCRIPTION OF THE PREFERRED EMBODIMENT

Figure 1:
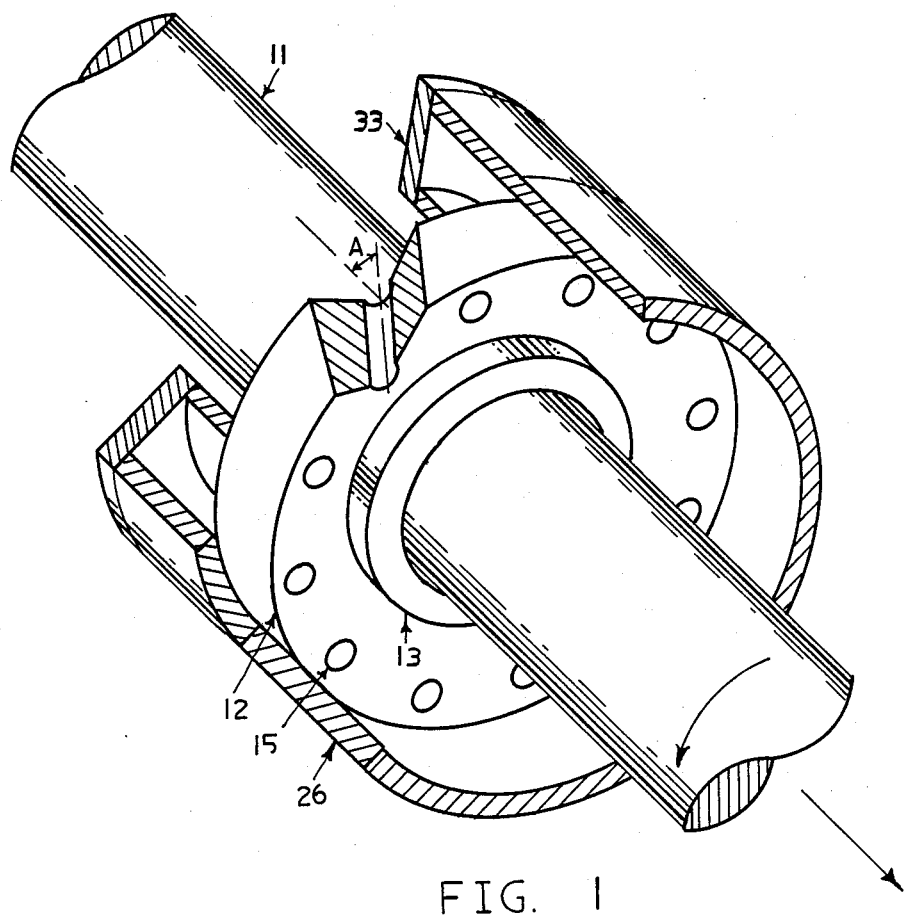
Figure 2:
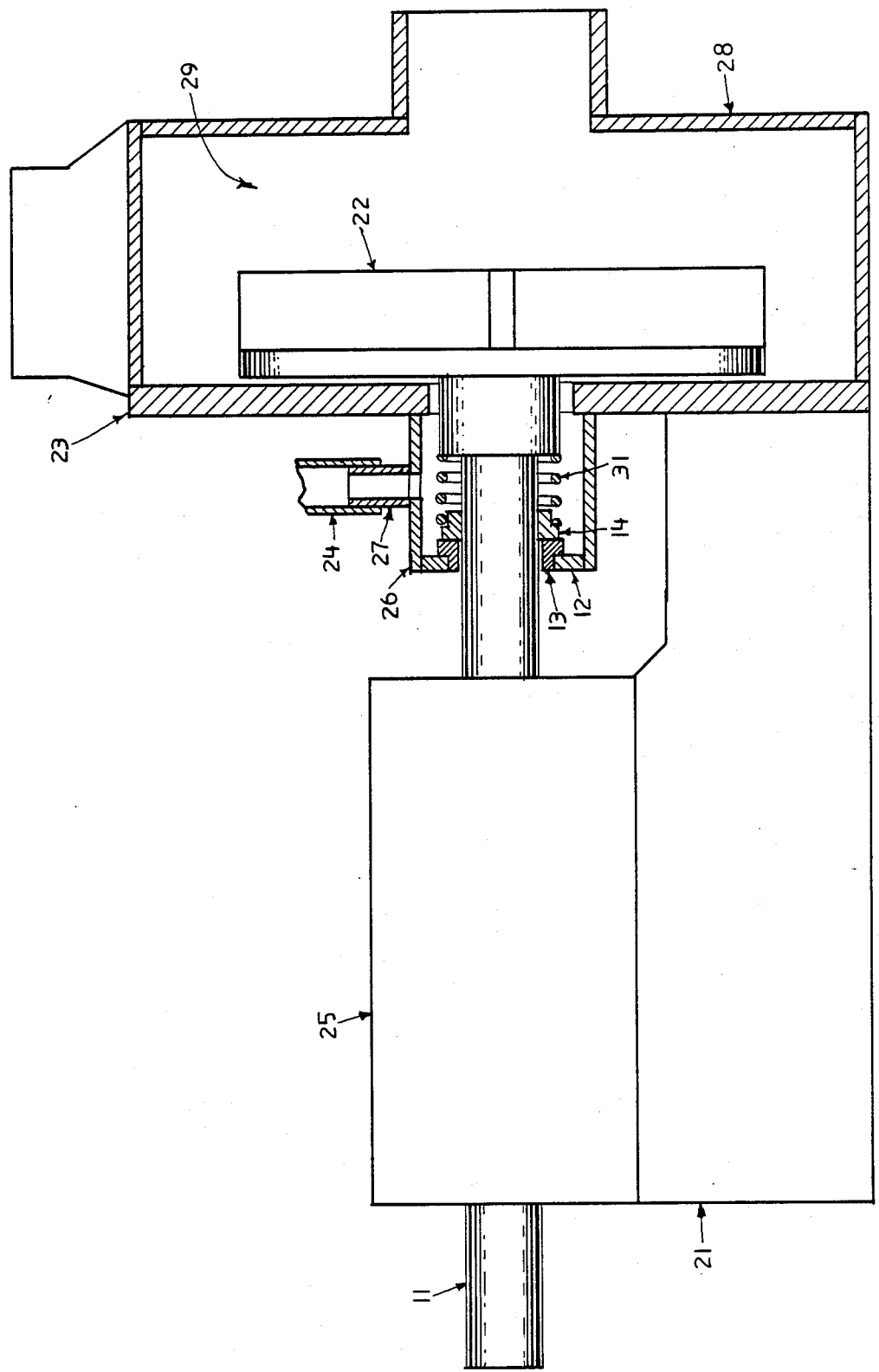
FIG. 2 is a schematic representation of devices of the PRIOR ART, illustrating placement of flush fluid inlet 27 forward of seal(s) 14.
Figure 3:
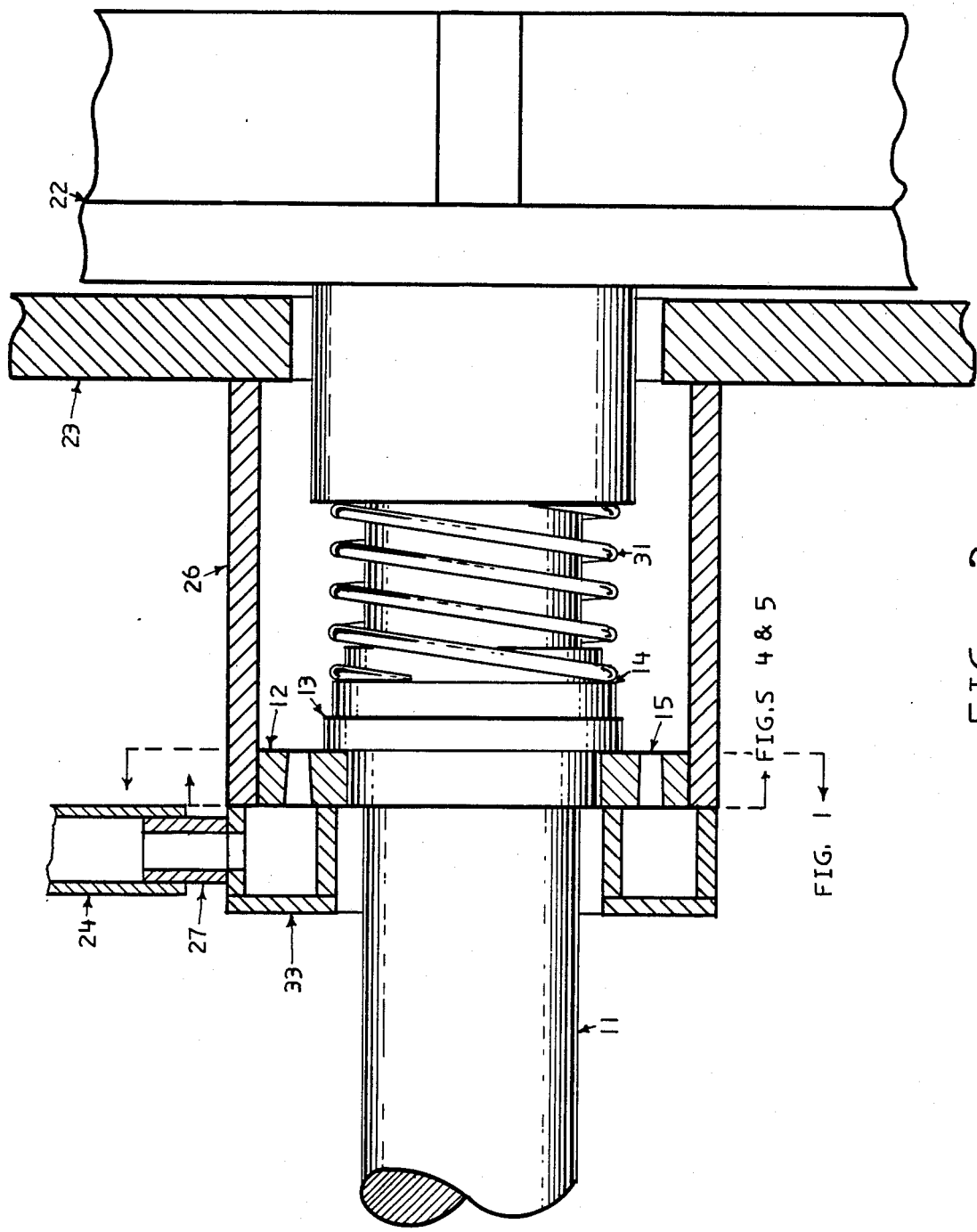
FIG. 3 is a longitudinal cross-sectional view of a current embodiment of an apparatus utilizing the method of the current invention, illustrating the believed flow of flush fluid through seal(s) housing-enclosure 26.

Within seal housing-enclosure 26, I alternatively define (FIG. 1) the forward direction as being towards impeller 22 away from the seal(s) 14; the rear is then the end within seal housing-enclosure 26 where seal seat 13 is usually mounted, and rearwardly is toward seal seat 13 and away from impeller 22; axial is the line along the center of impeller-shaft 11. I define "positive" using a right-hand rule, the right-hand thumb pointing forwardly along impeller-shaft 11 towards impeller 22 and the right-hand fingers curling in the direction of a positive angle, in the direction of impeller-shaft rotation, so that the "positive" acute angle specified for the inclination of the angled holes would always swirl the flush fluid into the seal(s) housing-enclosure in the same direction as the impeller-shaft rotation, regardless of which way an impeller-shaft 11 would rotate. For a shaft rotating in the other direction, my right-hand rule of positive angle indicates that inlet holes 15 would be formed in a rear plate 12 of seal housing-enclosure 26 so as to incline forwardly upwards rather than downward as shown in FIG. 1 for the sense of rotation shown in FIG. 1.

Seal seat 13 is usually secured within rear plate 12 with a o-ring.

Individually, or any combination of these improvements together: (a) rear-injection axial through-flow, (b) evenly spaced, circumferentially placed peripheral injection, and (c) shaft-rotation-angled peripheral injection-slots; therefore provides for a much more thorough and much more efficient seal flushing action than previously known; and thus radically, dramatically, and significantly increases the impeller-shaft seal life on centrifugal pumps pumping abrasive-laden fluids.

Figure 4:
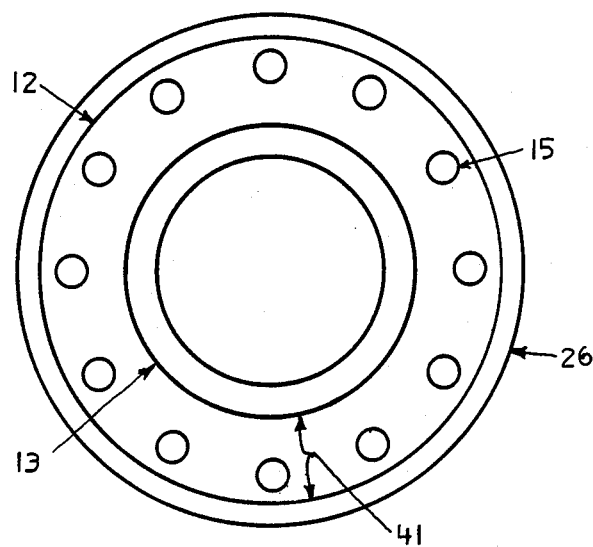
FIG. 4 is the indicated section taken from FIG. 3, showing the evenly spaced, circumferentially placed flush fluid inlet holes 15.
Figure 5:
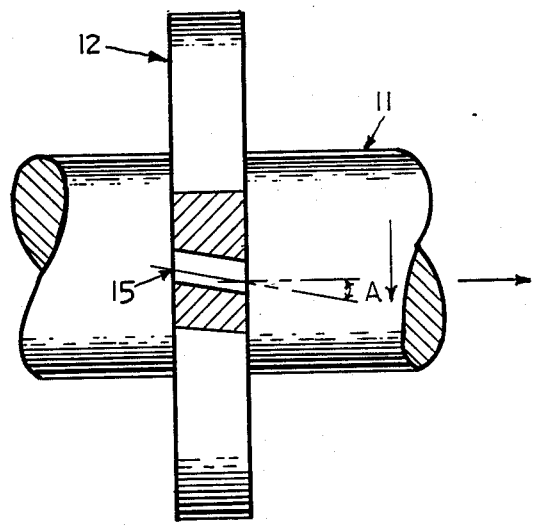
FIG. 5 is the indicated section taken from FIG. 4, showing the inclination of angle "A" of flush fluid inlet holes 15.

Continuing actual field experience (pontoon mining raft on remote tropical jungle fast-flowing deep river) with extensive use of the same type of seals before and after implementation of the improvements of this invention under equivalent pumping conditions have consistently continually shown that there is an immense beneficial improvement in the duration of seal life on centrifugal pump impeller-shaft seals installed using the methods and apparatus of this invention. This increase in seal life from days to months clearly demontrates the benefits of using my new seal flushing methods (FIG. 1) versus using prior methods (FIG. 4).

Thus has been achieved the increased impeller-shaft seal life object of this invention.

My current applications of this invention are constructed as follows.

Step. 1. Assume that the seal(s) housing-enclosure 26 is made of two tubes. The tubes are round pipe-like cylinders (I use 3" pipe) of suitable length, about 1½ inches. (Or, see the alternate method of step 4). When the seal seat 13 and the rest of seal housing-enclosure 26 is complete, seal(s) housing-enclosure 26 is welded to the back of pump case mounting plate 23.

Step. 2. I have combined rear plate 12 and seal seat 13 into one unit, for ease of field-installation. The seal seat 13 and rear plate 12 are made in the form of a washer. The inner diameter of this "washer" is made to be the diameter of the seal(s) seat 13. The outer diameter is such that it will be a snug fit in inner tube 61. Then, to get the angled grooves (holes) 15 into the circumference of rear plate 12, I use a ⅛th cut-off disk on a hand grinder to cut grooves 15 on angle "A" to correspond to the rotation direction of impeller-shaft 11. Number, size and depth of holes 15 vary according to the amount of flush water available. The angle "A" of the grooves-holes 15 varies with the normal working rotation speed of impeller-shaft 11.

Step. 3. Next combined seal seat 13/rear plate 12 with flush fluid (water) inlet grooves 15 is welded onto inner tube 61 with short welds between grooves 15.

Step. 4. Next a water jacket 33 is welded around the end of inner tube 61. (Or one could allow a "lip" on inner tube 61 to provide for flush fluid inlet 27.)

Step 5. This assembly is then welded to outer tube 62 which has a diameter a little larger than the rear plate 12 diameter.

Step. 6. An inner cylinder 63 is then welded to the rear plate 12 to serve as the shaft-surrounding inner wall of water jacket 33. Next an outer washer-type plate 64 is welded to the edges of inner and outer tubes 61 and 62 to complete seal(s) housing-enclosure 26. Weld the washer to the ends of the inner and the outer jacket.

Step 7. Weld the inlet pipe 27 over a hole in the seal(s) housing-enclosure 26. (Pipe size depends on the size of the pump and the amount of flush water to be injected.) If space permits, it is best to have the inlet on the bottom of the seal(s) housing-enclosure. Then, when changing seals, a high pressure jet of water or air will clean holes 15 and with the inlet hose 24 removed, any dirty water and debris will flow out of the inlet 27. To clean the inlet 27 while the pump is working, be certain that the pump is pumping CLEAN water. Disconnect the flush water at the source, so water will run out of the flush water inlet 27 and carry any dirt and pieces of debris out of the seal(s) housing-enclosure 26.

Step 8. After the seal(s) housing-enclosure is complete, and the pump case and bearing supports are welded; mount shaft 11, bearings, and seal(s) housing-enclosure 26 with the seal(s) 14 in place. This way you can be certain that the seal(s) housing-enclosure 26 is centered in relation to the impeller-shaft 11. When the seal(s) housing-enclosure 26 is centered, weld it to the pump case mounting plate 23.

The flush fluid inlet holes 15 are cleaned (if necessary) by the following method: before one shuts off the pump one always tries to pump clean water through the system to make sure the lines don't plug up and hamper start up the next day. At the same time a connection in the hose to flush fluid inlet holes 15 is parted and water flows in reverse through the flush fluid inlet holes 5. Whenever one changes seals, one checks the flush fluid inlet holes 15 and in case some are plugged, one cleans them. Then when starting to pump, let clear water flow in reverse to complete the cleaning action.

What is claimed is:

1. In a pump shaft sealing assembly, comprising a pump shaft having an impeller, a seal assembly for said pump shaft, a housing enclosing said seal assembly; the improvement of a method of flushing said seal assembly, said method comprising the steps of: (a) injecting pressurized seal flush fluid into said seal housing on a side of said seal opposite said impeller such that the flush fluid flows axially forwardly over said seal assembly towards said impeller; (b) causing said flush fluid to be injected equally circumferentially spaced about the periphery of the seal; and (c) continuing to inject said flush fluid in a direction at an acute angle to the axis of said pump shaft in the direction of rotation of the impeller.

2. In a centrifugal pump assembly including a pump shaft having an impeller, a seal assembly for said pump shaft, and a housing enclosing said seal assembly, the improvement comprising an inlet located on a side of said seal opposite said impeller for pressurized flush fluid, a plate of said housing located between said inlet and said seal assembly having a plurality of axially extending, equally circumferentially spaced inlets formed therein, said inlets inclined at an acute angle to the axis of said pump shaft in the direction of rotation of the impeller.

* * * * *